(12) United States Patent
Joyce et al.

(10) Patent No.: US 11,834,206 B1
(45) Date of Patent: Dec. 5, 2023

(54) UNIVERSAL LONG-TERM IN SPACE STRUCTURAL ERECTION SYSTEM

(71) Applicant: MADE IN SPACE, INC., Moffett Field, CA (US)

(72) Inventors: Eric R. Joyce, Sunnyvale, CA (US); Michael P. Snyder, Jacksonville, FL (US); Maxwell H. Fagin, San Jose, CA (US); Daniel J. Riley, Sunnyvale, CA (US)

(73) Assignee: REDWIRE SPACE, INC., Jacksonville, FL (US)

( * ) Notice: Subject to any disclaimer, the term of this patent is extended or adjusted under 35 U.S.C. 154(b) by 1335 days.

(21) Appl. No.: 15/953,275

(22) Filed: Apr. 13, 2018

Related U.S. Application Data

(60) Provisional application No. 62/485,126, filed on Apr. 13, 2017.

(51) Int. Cl.
| | |
|---|---|
| *B64G 99/00* | (2009.01) |
| *H01R 13/05* | (2006.01) |
| *H01R 24/68* | (2011.01) |
| *B64G 4/00* | (2006.01) |
| *B29C 64/118* | (2017.01) |
| *B29C 64/20* | (2017.01) |
| *B33Y 80/00* | (2015.01) |
| *B33Y 30/00* | (2015.01) |
| *H01R 103/00* | (2006.01) |

(52) U.S. Cl.
CPC ............ *B64G 99/00* (2022.08); *B29C 64/118* (2017.08); *B29C 64/20* (2017.08); *B33Y 30/00* (2014.12); *B33Y 80/00* (2014.12); *B64G 4/00* (2013.01); *H01R 13/052* (2013.01); *H01R 24/68* (2013.01); *B64G 2004/005* (2013.01); *H01R 2103/00* (2013.01)

(58) Field of Classification Search
CPC ...... B64G 9/00; B64G 4/00; B64G 2004/005; B33Y 30/00; B33Y 80/00; H01R 13/052; H01R 24/68; H01R 2103/00; B29C 64/20; B29C 64/118
See application file for complete search history.

(56) References Cited

U.S. PATENT DOCUMENTS

| | | | |
|---|---|---|---|
| 5,145,130 A * | 9/1992 | Purves | B64G 1/641 |
| | | | 901/1 |
| 9,796,486 B1 * | 10/2017 | Illsley | B64G 1/26 |
| 10,170,878 B1 * | 1/2019 | Reulman, Sr. | H02G 3/121 |
| 10,401,832 B2 * | 9/2019 | Snyder | B29C 64/357 |

(Continued)

OTHER PUBLICATIONS

Cox et al., Fiber Encapsulation Additive Manufacturing: Technology and Applications Update, 2016, 3D Printing and Additive Manufacturing, vol. 00, pp. 1-4.*

*Primary Examiner* — Valentina Xavier
(74) *Attorney, Agent, or Firm* — Terry M. Sanks, Esq.; Beusse Sanks, PLLC

(57) ABSTRACT

An outer space-based reusable manufacturing and assembly system including at least one joint that comprises at least one receiver component, at least one strut that engages the at least one receiver component on the at least one joint and a joining element that provides for engaging and disengaging the at least one joint with at least the at least one strut so that either the at least one joint and the at least one strut are usable for another mission. Two other systems are also disclosed.

17 Claims, 15 Drawing Sheets

(56) References Cited

U.S. PATENT DOCUMENTS

| | | | | |
|---|---|---|---|---|
| 10,571,642 | B1* | 2/2020 | Cohen | G02B 6/25 |
| 10,598,880 | B2* | 3/2020 | Mullaney | G02B 6/383 |
| 10,906,290 | B2* | 2/2021 | Yerazunis | B64G 9/00 |
| 11,006,975 | B1* | 5/2021 | Cohen | A61B 17/00234 |
| 11,014,303 | B1* | 5/2021 | Higham | B29C 64/364 |
| 11,084,710 | B1* | 8/2021 | Raven | B64G 1/402 |
| 2003/0207603 | A1* | 11/2003 | Potega | H01R 24/58 439/218 |
| 2009/0177309 | A1* | 7/2009 | Kozlak | B29C 64/321 700/119 |
| 2013/0170171 | A1* | 7/2013 | Wicker | H01L 21/4846 361/809 |
| 2014/0361460 | A1* | 12/2014 | Mark | B29C 70/521 264/248 |
| 2015/0108687 | A1* | 4/2015 | Snyder | B29C 64/259 264/308 |
| 2015/0210408 | A1* | 7/2015 | Dunn | B33Y 80/00 244/159.4 |
| 2016/0082652 | A1* | 3/2016 | Snyder | B29C 64/35 264/40.1 |
| 2017/0036783 | A1* | 2/2017 | Snyder | B29C 64/118 |
| 2018/0183190 | A1* | 6/2018 | Volkmann | H01R 4/22 |
| 2019/0214737 | A1* | 7/2019 | Dominocielo | H01Q 1/288 |
| 2019/0386432 | A1* | 12/2019 | Aoshima | H01R 13/6453 |
| 2020/0106215 | A1* | 4/2020 | Montena | H01R 9/0503 |
| 2020/0361138 | A1* | 11/2020 | De Jong | B33Y 30/00 |
| 2021/0221540 | A1* | 7/2021 | Panetti | B64G 1/641 |

\* cited by examiner

UNIVERSAL LONG-TERM IN SPACE STRUCTURAL ERECTION SYSTEM

CROSS-REFERENCE TO RELATED APPLICATIONS

This application claims the benefit of U.S. Provisional Application No. 62/485,126 filed Apr. 13, 2017, the entire contents of which is incorporated herein by reference.

BACKGROUND

Embodiments relate to a space-based structure and, more particularly, a system and method to provide a space-based structure that may be assembled, disassembled and reconfigured while in space.

Currently, space hardware is constructed on the ground and then launched into orbit. In most instances, once in space, the space hardware is mechanized to deploy from a folded configuration to an operational configuration. Ground launched components are ultimately limited in size and performance due to the volume constraints of a payload fairing and the weight constraints of a launch vehicle.

The state of the art method of using deployable components for trusses and booms partially offsets the volume limitations, but such components suffer from increased complexity, cost and the potential for deployment failures. Furthermore, the structural members must not only be optimized for a space environment, but also to survive launch loads.

Issues with constructing in space are also known. For example, deployable structures are typically very expensive and complex. These structures must be designed to endure the rigors of launch in a tightly packed configuration while maintaining the freedom to reliably unfurl or extend once on orbit. Deployable structures generally contain numerous complex and costly joints and mechanisms.

Cost, complexity and risk are high for on-orbit assembly of space structures using astronaut Extravehicular Activities (singularly an "EVA"). The International Space Station ("ISS") is an example of the state-of-the-art for on-orbit assembly of large structures. In-space assembly of large space systems is exemplified by the construction of the ISS. The components were provided by more than thirty (30) launches and some structural elements were slowly assembled by spacewalking astronauts. The Extravehicular Activities (EVA) performed by astronauts to construct the structural trusses were time-consuming, expensive and dangerous even though substantial efforts were undertaken to make the EVAs as safe as possible. The high risk and low availability of astronaut EVAs for creating large space-based structures has limited activities such as assembling a space station to a once-in-a-generation endeavor and are impossible for any unmanned mission. The capability for robotic on-orbit assembly of large space structures does not currently exist.

Also, current space infrastructure is designed for a single mission and is rarely reused to support subsequent missions. Therefore, once a mission is concluded, the infrastructure becomes space junk or debris.

Thus, a need exists for components that are used for in-space manufacturing and assembly of spacecraft and space structures having a need for electro-mechanical connectivity where the cost of launching components from Earth are reduced as the components may be developed in space and where the components may be used for more than a single mission.

SUMMARY

Embodiments relate to an outer space-based manufacturing and assembly system to erect a space based structure in which the space based structure may be assembled, disassembled and reconfigured in space. The system comprises at least one joint that comprises at least one receiver component. The system further comprises at least one strut that engages the at least one receiver component on the at least one joint. The system also comprises a joining element that provides for engaging and disengaging the at least one joint from the at least one strut so that either the at least one joint and the at least one strut are usable for another mission.

A system comprises a space-based additive manufacturing device, a space-based assembly joint with an electrical load transfer path created with the additive manufacturing device and a first space-based strut with an electrical load transfer path created with the additive manufacturing device. The system further comprises a first wiring harness provided within the strut during the additive manufacturing process to provide the electrical load transfer path with a first connector to provide for electrical load transfer between the strut and at least one of a second strut, the joint, and a modular device when at least one of the first strut and the joint are engaged, the first strut and the second strut are engaged, and the first strut and the modular device are engaged.

Another system comprises a space-based robotic manipulator and a plurality of structural elements that are assembled, disassembled and reconfigured on-orbit by the robotic manipulator. The structural elements comprise reversible mechanical and electrical interfaces that are integrated into structural elements for a space-based system.

BRIEF DESCRIPTION OF THE DRAWINGS

A more particular description briefly stated above will be referenced to specific embodiments thereof that are illustrated in the appended drawings. Understanding of these drawings depict only typical embodiments and are not therefore to be considered to be limiting of its scope. The embodiments will be described and explained with additional specificity and detail through the use of the accompanying drawings in which.

DETAILED DESCRIPTION

Figure 1A:
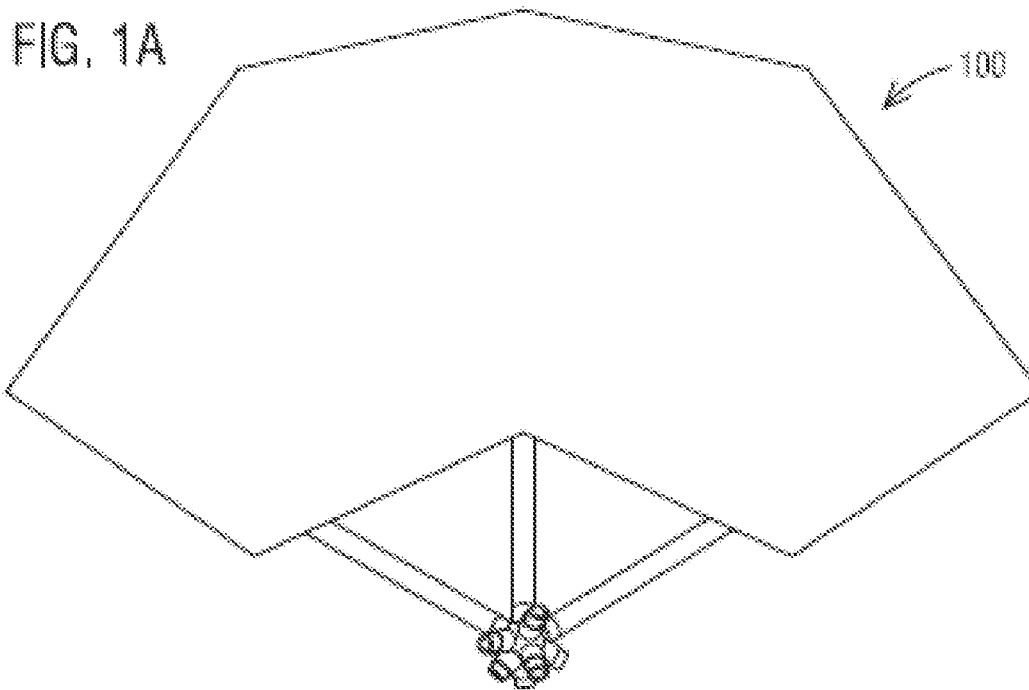
FIGS. 1A-1C show an embodiment of a joint, or node, that is part of a space-based structure.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 1B:
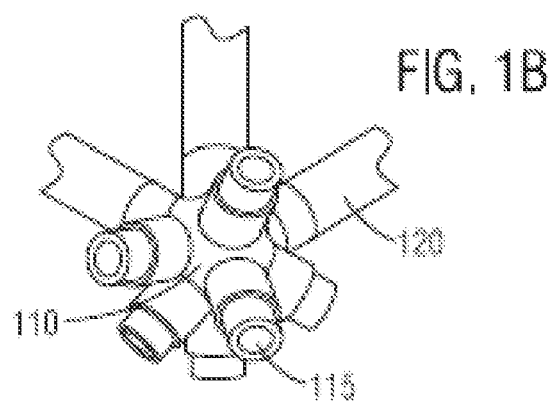
Figure 1C:
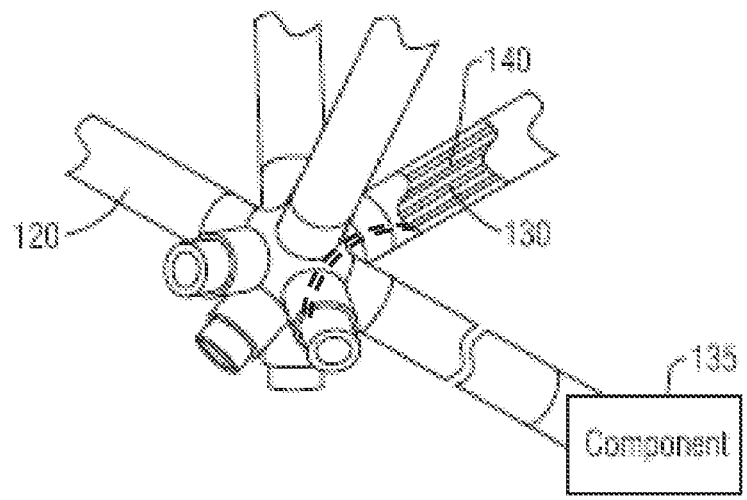

FIGS. 1A-1C show an embodiment of a joint that is part of a space-based structure. The joint comprises at least one node. FIG. 1A shows a space-based structure 100. FIG. 1B is an exploded view at a joint 110 of FIG. 1A. As shown in FIG. 1B, the joint 110 is provided. The joint 110 has a plurality of nodes 115, or receptacles. Individual struts 120 are attached to individual nodes 115. FIG. 1C shows a further exploded view of FIG. 1B with a cutaway view of the strut 120. A wiring harness 130 is shown within the strut 120.

As mentioned above, the joint 110 may comprise at least one node 115 to which a strut 120, another joint or a modular component 135, or device, may be connected. A plurality of struts 120 may be connected to each individual node 115 in an arbitrary assembly. The strut 120 may provide mechanical and electrical load transfer paths 140 that are provided into the at least one node 115. The wiring harness 130 may be provided within the paths 140 to provide the electrical load transfer. In another embodiment, the wiring harness 130 is the electrical load transfer paths as the wiring harness 130 is placed so that the strut 120 is manufactured around the harness 130. A second wiring harness 131 may also be provided within the joint 110. Thermal loads may be transferred between the components 110, 115, 120 through radiation and conduction. The joint 110 may provide truss segment joints as well as module joints. Thus, the node 115 may be used to attach a truss segment (recognized herein as the strut 120) or a module 135 may be attached to the joint 110 by way of the node 115.

Figure 2:
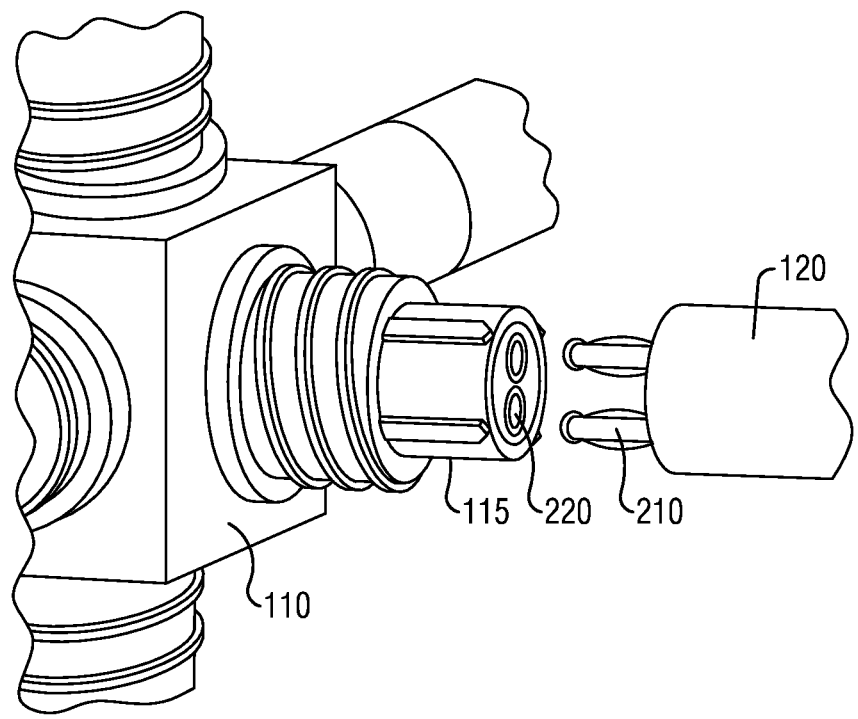
FIG. 2 shows a joint with a cutaway view of a strut with a wiring harness.

FIG. 2 shows a joint with a cutaway view of a strut with a wiring harness. The strut in FIG. 2 is not yet engaged with the node. The wiring harness may be interchangeable to provide flexibility to transfer electrical power alone or electrical power as well as a low voltage data signal. The node may comprise at least one of an electrical connector and a mechanical connector. The mechanical and electrical connectors may be selected based on two main factors, complexity of the structure and ease of assembly. The mechanical connector may be designed as an axial assembly so that a wiring harness may be integrated into the design and allow for simple pins to form the electrical connection. Doing so may result in less complex electrical connectors while still providing for a robust electrical connection in which the connection is both reversible and repeatable.

As is further illustrated in FIG. 2, an end of the strut 120 may contain a male connector pin 210 whereas the node 115 may contain a female connector receptacle 220. This arrangement may be reversed, however. The strut 120 may contain the wiring harness 130, discussed herein, which may transfer either electrical power alone, data signals alone or electrical power and data through to the connector pin 210. The wiring harnesses 130 may be used to add stiffness to the strut 120, if needed. The wiring harnesses 130 may have a same external shell whether carrying electrical power exclusively, data signals exclusively or power and data signals. The wiring harnesses 130 may be interchangeable to maximize utility, meaning other harnesses 130 may be interchanged with a first harness 130.

The joint 110 may contain connectors within the joint (not shown) to transfer electrical power as well as data through the joint 110 to another location where the strut 120, joint 110 or modular component 135 may be connected to the joint 110 by way of the node 115 described herein. This enables the nodes 115 to connect to either struts 120 or external modules 135 such as, but not limited to, an orbital replacement unit (ORU). Thus, one or more joints 110 and struts 120 may be assembled and disassembled to either form a space-based structural component 110, or system, or rearranged to form another space-based structural component, or system. When assembled in space, the joints 110 may be a basis for a complete mechanical and electrical space-based infrastructure solution for current and future space missions, providing fully integrated and multifunctional struts 120, nodes 115 and integrated wiring harnesses 130. At a component level, the joints 110 may be used with struts 120 and may provide a wiring harness 130 with electro-mechanical joints linking the components into an assembly 100.

Figure 3:
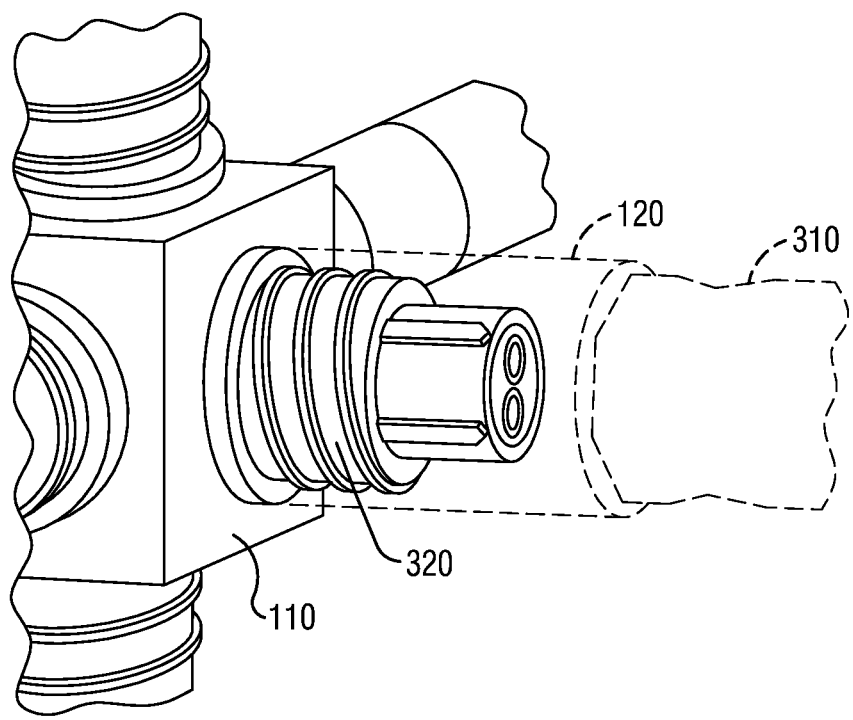
FIG. 3 shows an embodiment of a strut being manufactured.

FIG. 3 shows an embodiment where the strut is engaged with the node. A joining element 310 may be used to engage and disengage the strut 120 from the node 115. As further illustrated, the joining element 310 may be a collar, or collar device. The collar 310 may be a part of the strut 120. The collar 310 may connect to a receiving element 320 on the node 115. In the embodiment shown in FIG. 3, a threaded member 330 is a part of the node 115 and receives the collar 310, specifically mating threads on the collar 310.

Figure 4:
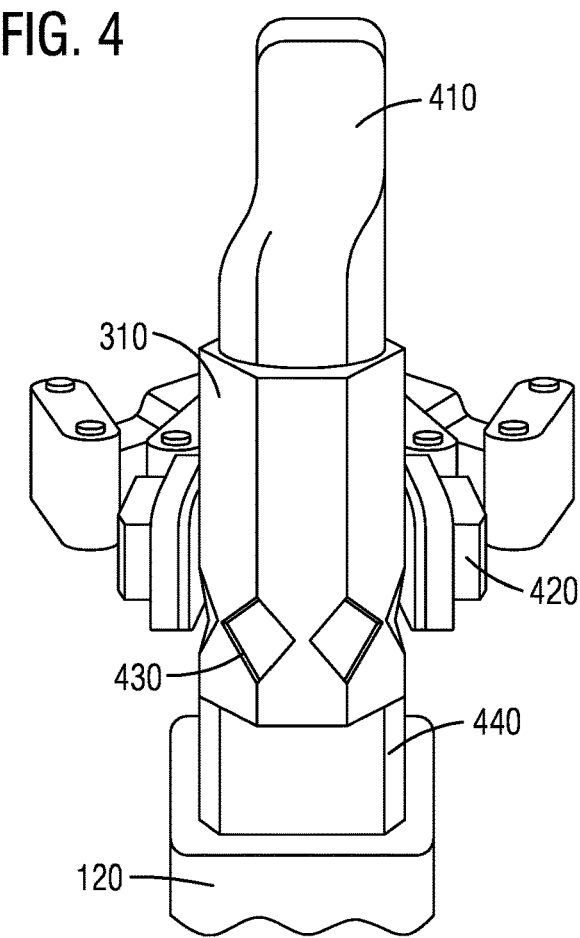
FIG. 4 shows an embodiment of the collar.

FIG. 4 shows an embodiment of the collar. The collar 310 may be a part of the strut 120 that has a male dovetail-based connector 410. A robotic manipulator 420 is also shown in contact with the collar 310. The collar 310 may have a breakaway configuration 430, or element, wherein the robotic manipulator 420 causes the collar 310 to separate from a part of the strut 120, or a more permanent fixed part of the collar 440 connected to the strut 120 when the robotic manipulator 420 rotates or twists the collar 310.

Figure 5:
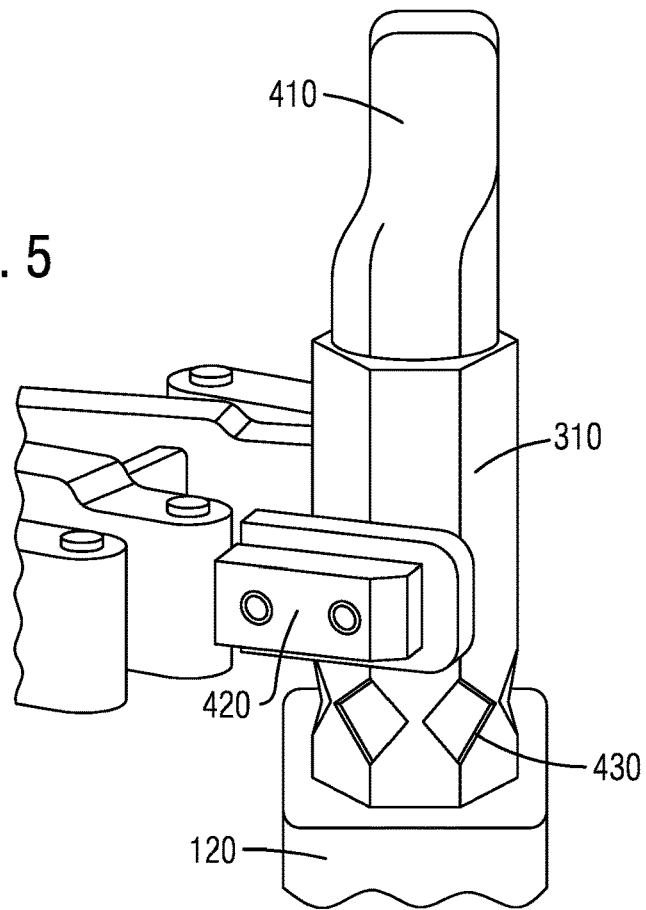
FIG. 5 shows an embodiment of the collar disengaged from the strut.

FIG. 5 shows an embodiment of the collar disengaged from the strut. As illustrated, a diamond arrangement 430 that facilitates the breakaway arrangement is no longer visible as the collar 310 is being rotated. The robotic manipulator 420 is able to first disengage the collar 310 from its connection and then position it so that it is engaged with the node 115. As explained further herein, the collar 310 may then be locked into place once the node 115 and strut 120 are mated. Though a break style collar 310 is disclosed, other embodiments are possible.

Figure 6:
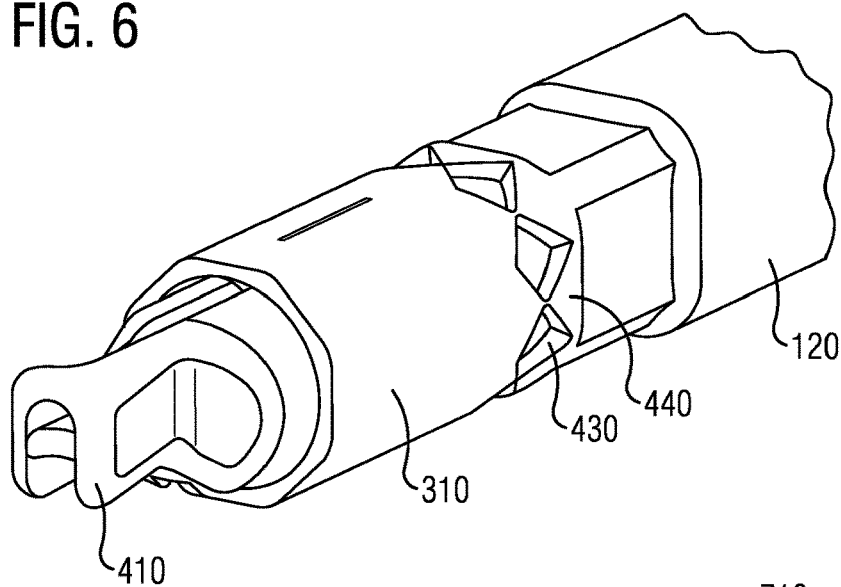
FIG. 6 shows another view of the strut with the collar.
Figure 7:
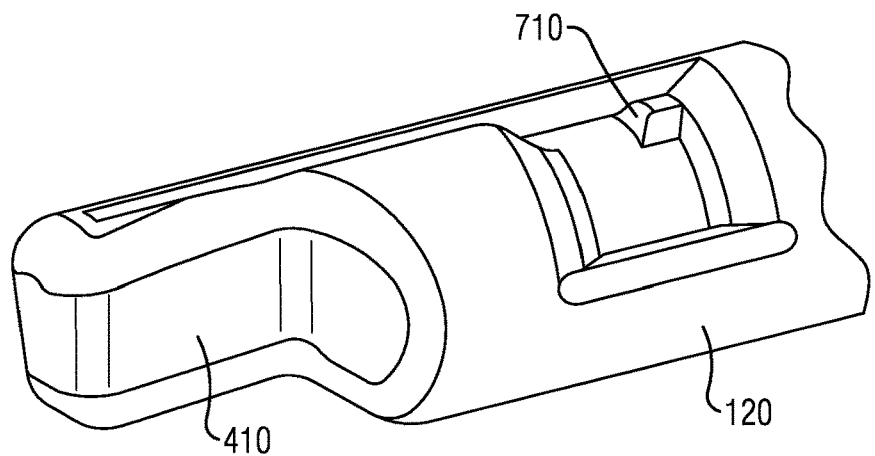
FIG. 7 shows another view of the strut where the locking mechanism to lock the collar in place is also visible.

FIG. 6 shows another view of the strut with the collar. As is also visible is the male dovetail connector 410 of the strut 120. FIG. 7 shows another view of the strut 120 where a locking mechanism 710 to lock the collar 310 in place is also visible. The collar device 310, or element, comprises a receiving engagement device that engages with the locking mechanism on the strut when the strut and node are mated.

Figure 8:
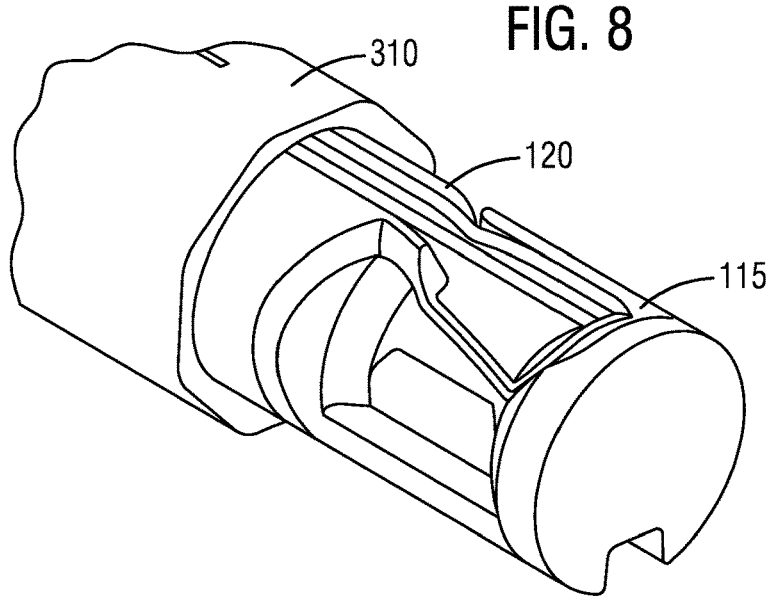
FIG. 8 shows an embodiment of the strut and node mated.

FIG. 8 shows an embodiment of the strut and node mated. As illustrated, the node 115 may also comprise a locking mechanism to further ensure that the collar 310 is fixed to both the strut 120 and node 115 when the collar is engaged. Thus, the collar is provided to secure and then can be used to unsecure attached components, 110, 120, 135.

Figure 9:
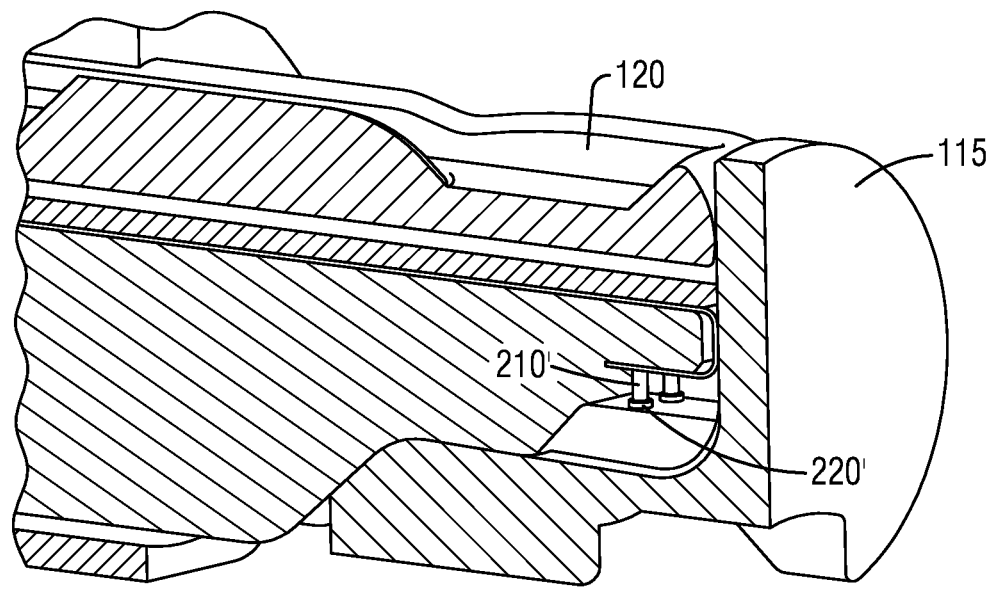
FIG. 9 shows an embodiment of a cross section of the strut and node mated.

FIG. 9 shows an embodiment of a cross section of the strut and node mated. An electrical connection 210', 220' between the strut 120 and node 115 is visible. Using a dovetail-based connection arrangement 410, the strut 120 and node 115 may be radially connected or assembled.

Figure 10:
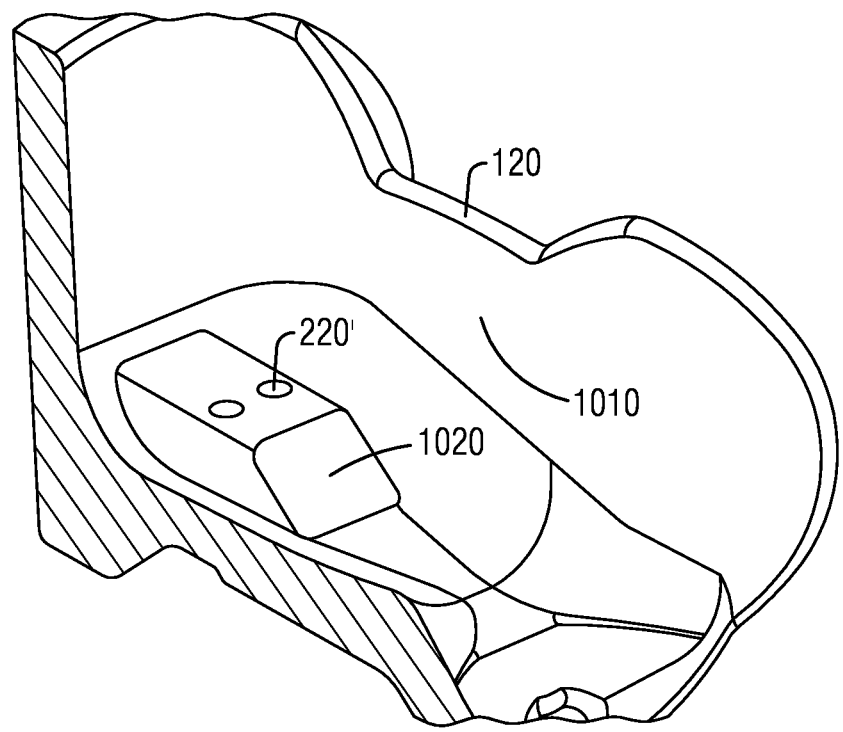
FIG. 10 shows cross sections views of an embodiment of a female dovetail part of the node.
Figure 11:
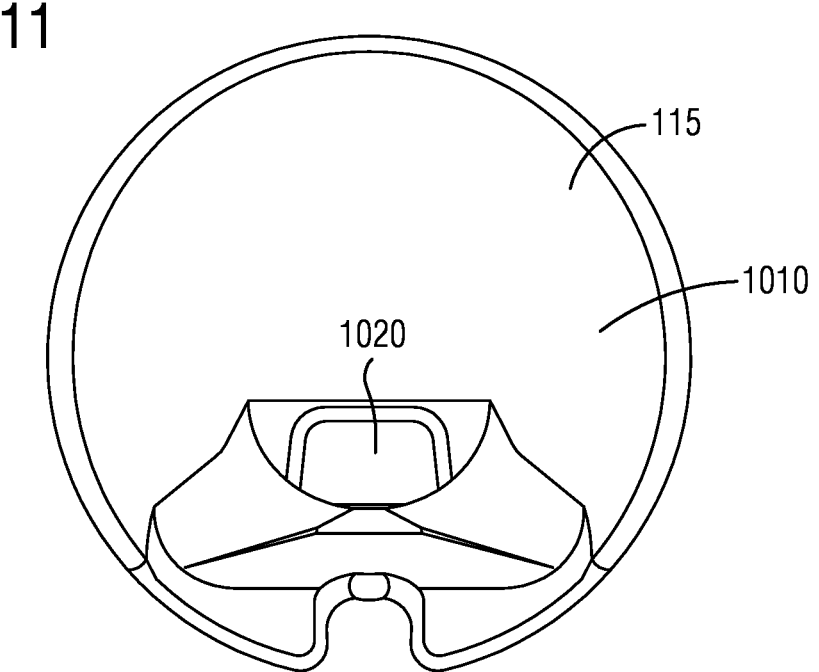
FIG. 11 shows a frontal view of an embodiment of a female dovetail part of the node.

FIG. 10 shows cross sections views of the female dovetail part of the node and FIG. 11 shows a frontal view. The electrical connector part 210' of the strut 120 is raised to radially interact with the electrical connector part 220' of wiring harness 130 within the strut 120. The frontal view also shows the raised electrical connector arrangement within the node which also provides for assisting a female-dovetail connector 1020 that engages the male-dovetail connector 410 of the strut 120.

Figure 12:
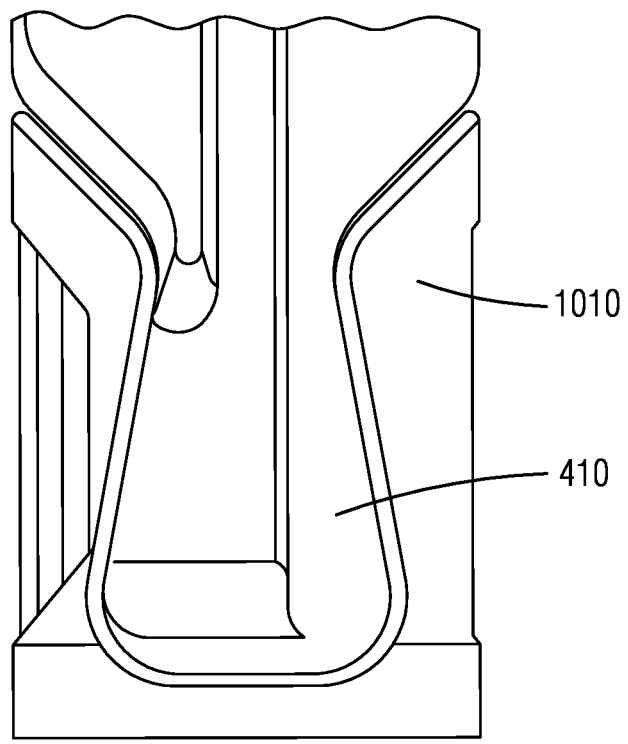
FIG. 12 shows another cutaway view of an embodiment of the node and strut mated.

FIG. 12 shows another cutaway view of an embodiment of the node 115 and strut 120 mated. As viewed, the components 115, 120 are further locked due to the male and female dovetail connectors 410, 1010 between the two components 115, 120. This arrangement provides for the robotic manipulator 420 being able to disengage the strut 120 from the node 115, or the node 115 from the strut 120, depending on which component the robotic manipulator 420 is engaged with.

Figure 13:
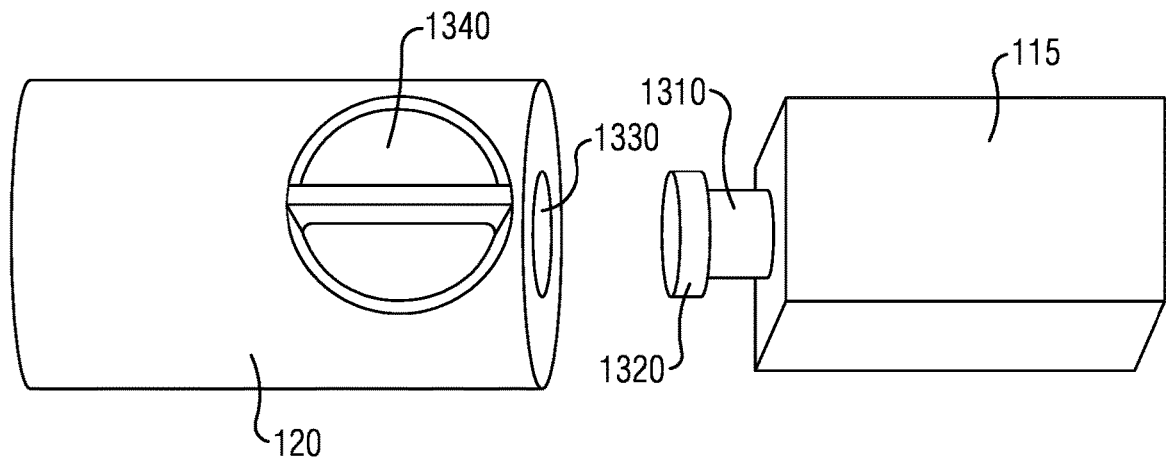
FIG. 13 shows another embodiment for connecting the joint to the strut or module.
Figure 14:
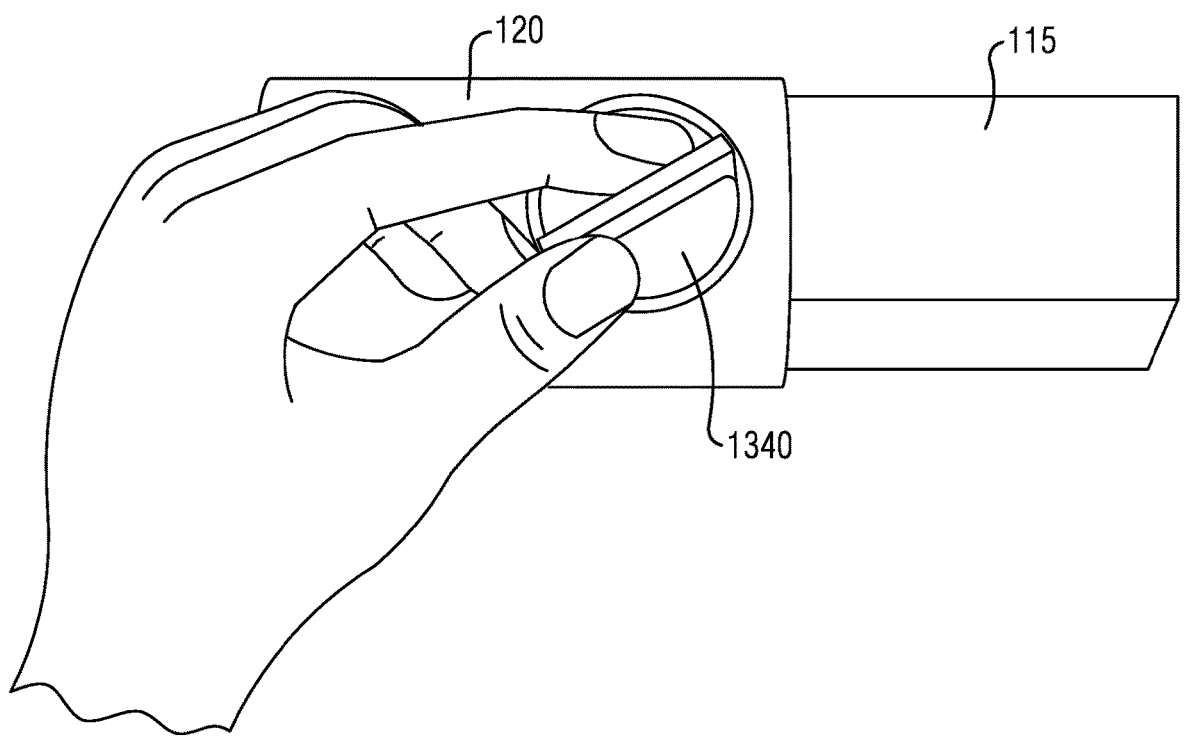
FIG. 14 shows the components of FIG. 13 engaged.

Other approaches for connecting and disconnecting the joint and strut or module are also possible. FIG. 13 shows another embodiment for connecting the joint to the strut or module and FIG. 14 shows the components engaged. The node 115 may comprise a male component 1310 with a ridge 1320 at a distal end from where the node 115 terminates on the joint 110. The strut 120 or module 135 may have an opening 1330, or receiver, to receive the male component 1310 of the node 115. A locking element 1340 may be provided as part of the strut 120 or module 135 and may be engaged to lock the strut 120 or module 135 to the node 115 once the two components are engaged. Though locking element 1340 may be engaged or disengaged either manually or via robotic manipulation.

Figure 15:
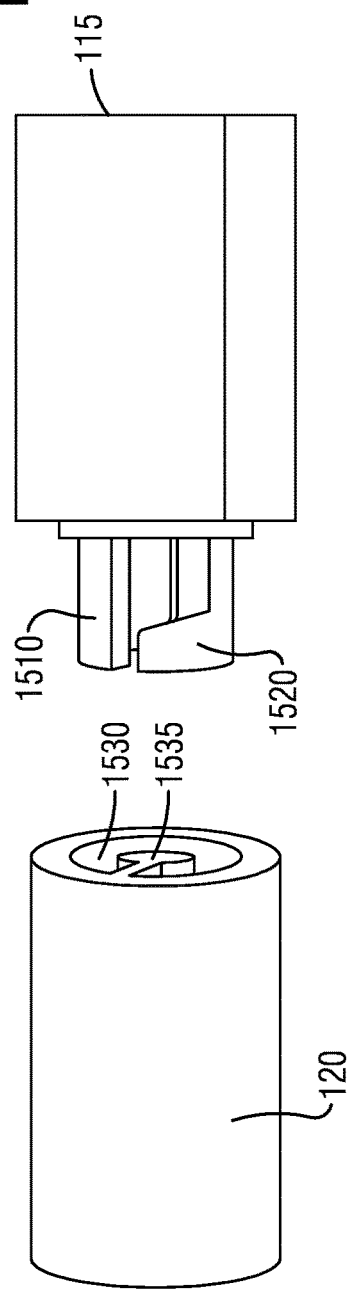
FIG. 15 shows another embodiment for connecting a joint with a strut or module.

FIG. 15 shows another embodiment for connecting a joint with a strut or module. The node 115 has a receiver 1510 into which a male connector 1520 that is secured in place within a receiver 1530 of the strut 120 or module 135. The receiver 1530 has a locking mechanism 1535, or element, that locks the male connector 1520 in place when either the node 115 or strut 120 are rotated. The receiver 1530 also is arranged to receive the locking element that is within the strut 120 or module 135. Once engaged, the strut 120 or module 135 may be rotated or twisted where the locking element 1535 that extend to the inner walls of the strut 120 or module 135 lock the strut 120 or module 135 in place with respect to the node 115 or joint 110.

Figure 16:
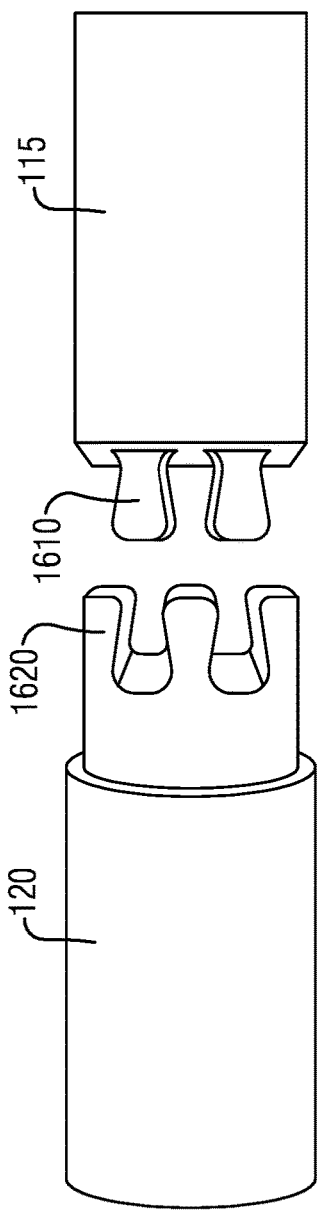
FIG. 16 shows another embodiment for connecting a joint with a strut or module.
Figure 17:
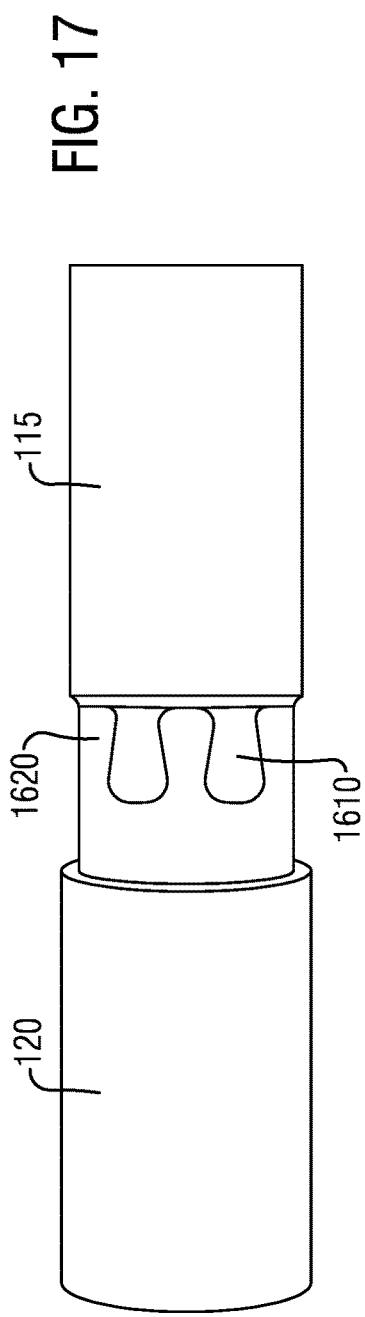
FIG. 17 shows the embodiment of FIG. 16 engaged.

FIGS. 16 and 17 show another embodiment for connecting the joint with the strut or module. As shown, male connectors 1610 with a wider head than a base (a dovetail arrangement) are provided to engage female connectors 1620 with an initial receiving end that is narrower than a base end of the female connector. Thus, once engaged, the two components are locked together.

Figure 18:
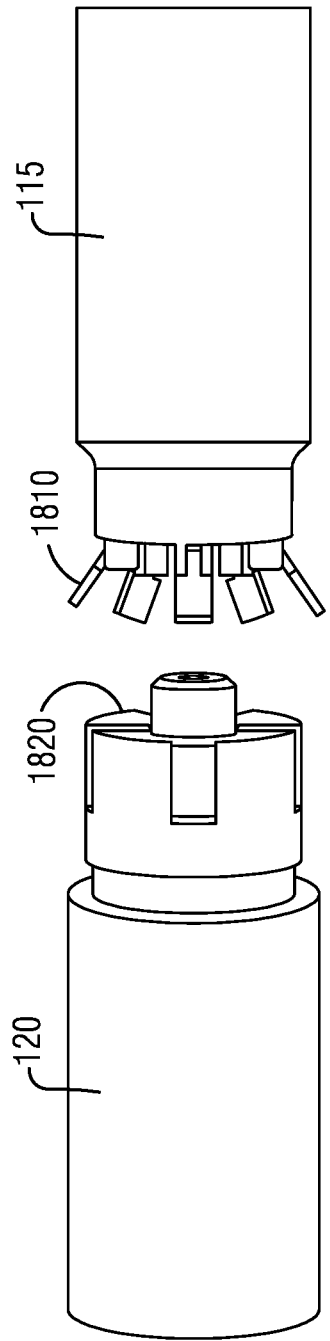
FIG. 18 shows another embodiment for connecting a joint with a strut or module.
Figure 19:
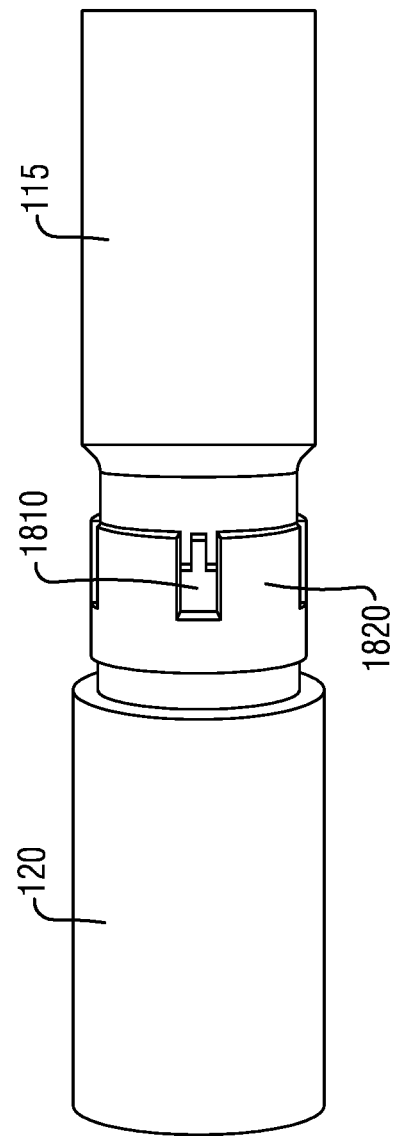
FIG. 19 shows the embodiment of FIG. 18 engaged.

FIGS. 18 and 19 show another embodiment for connecting a joint with a strut or module. As shown, when engaged, a mechanism provides for one end to have components 1810 to activate or move from a non-locked arrangement, as shown in FIG. 18, to a locked arrangement, as shown in FIG. 19, onto a non-moving component 1820.

Figure 20:
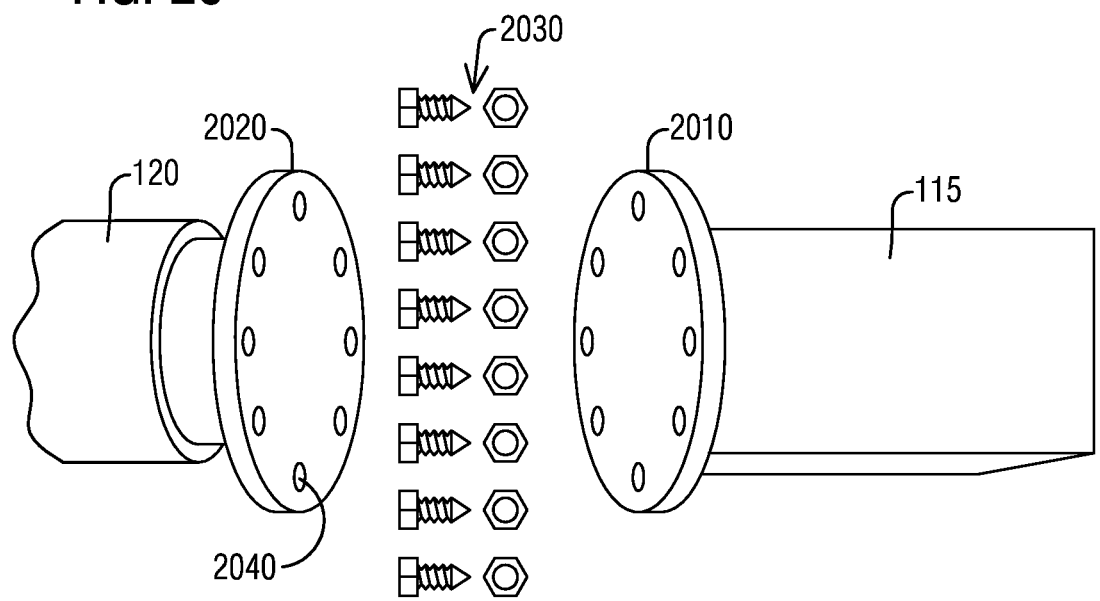
FIG. 20 shows another embodiment for connecting a joint with a strut or module.
Figure 21:
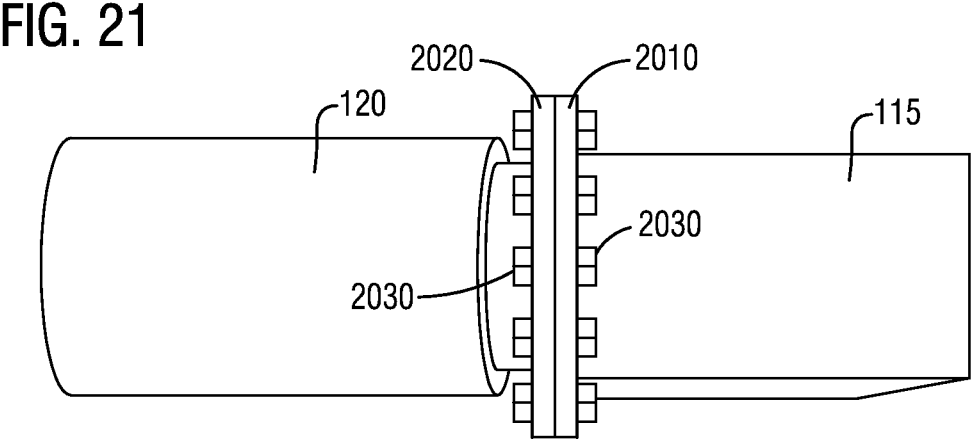
FIG. 21 shows the embodiment of FIG. 20 engaged.

FIGS. 20 and 21 show another embodiment for connecting a joint with a strut or module. As shown, mating plates 2010, 2020 are available, one at the end of the strut 120 or module 135 and another at the end of the node 115. Connectors 2030 such as, but not limited to, bolts, may be used to secure the plates together. Though bolts are shown, other connectors such as those shown in the other figures or a variation thereof, may be used. Thus, as a non-limiting example, the holes 2040 on the strut 120 or module 135 may comprise male connector members that engage female connector members located on the node's plate. The male connector may be arranged such as, but not limited to, by varying the diameter to lock the male connector within the female connector.

Figure 22:
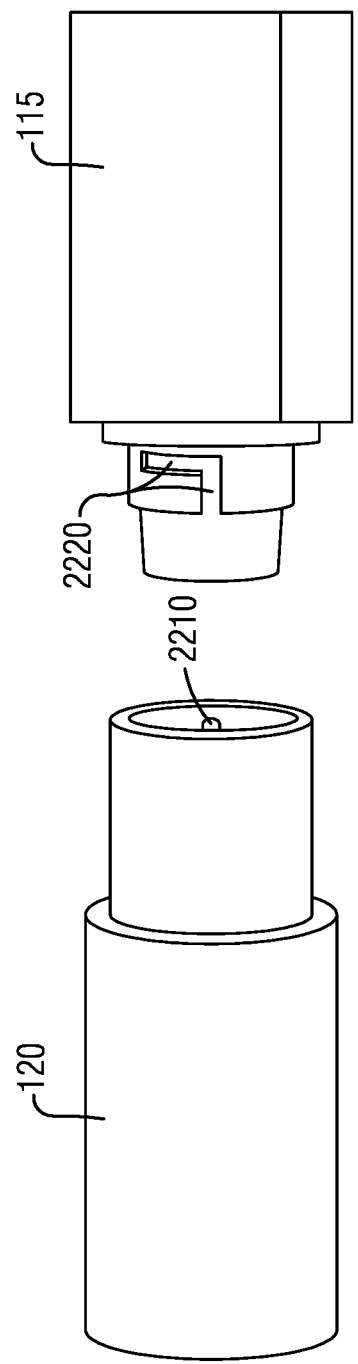
FIG. 22 shows another embodiment for connecting a joint with a strut or module.
Figure 23:
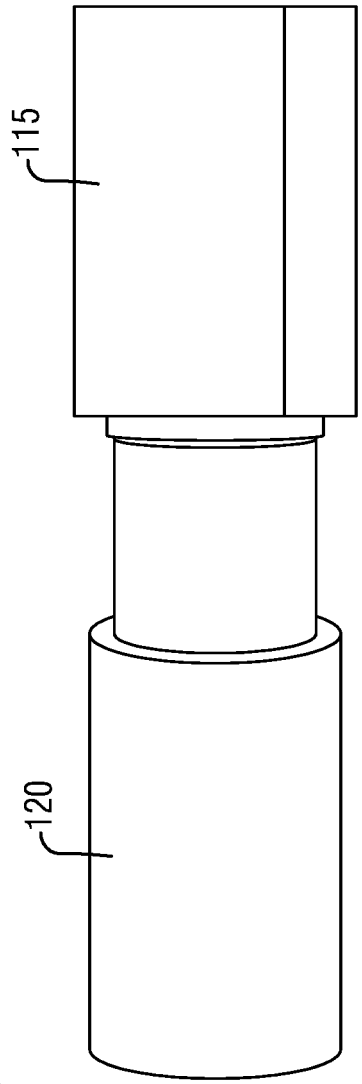
FIG. 23 shows the embodiment of FIG. 22 engaged.

FIGS. 22 and 23 show another embodiment for connecting a joint with a strut or module. As shown, a detent 2210 may be provided on one component 120, and a groove 2220 to receive the detent 2210 provided on the connecting component 115. Thus, when the component with the detent 2210 is rotated or twisted once engaged, the detent 2210 will be secured within the groove 2220.

Figure 24:
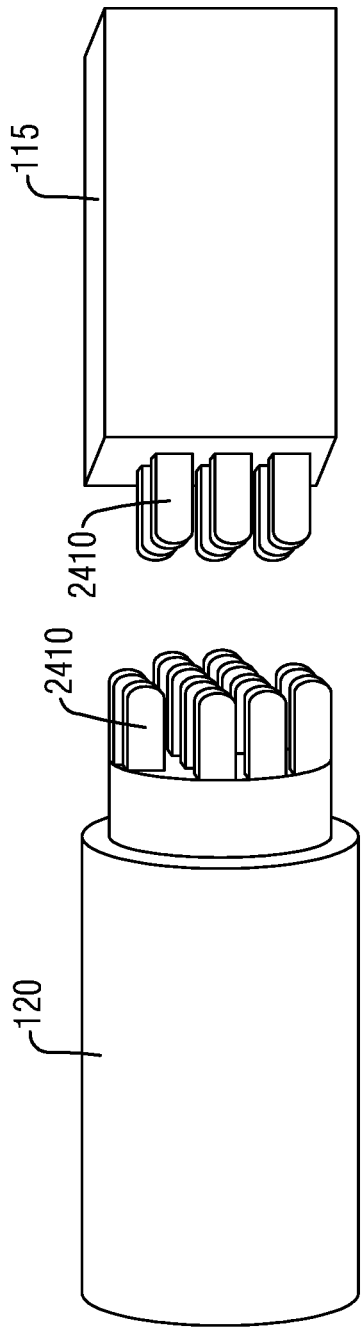
FIG. 24 shows another embodiment for connecting a joint with a strut or module.
Figure 25:
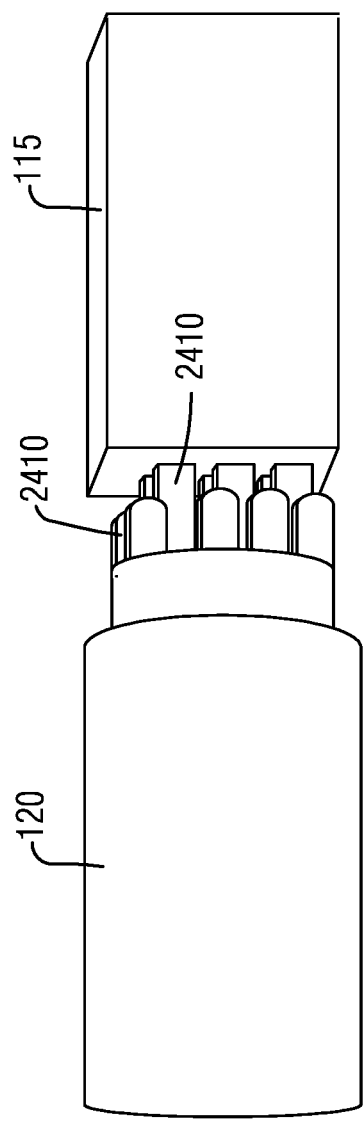
FIG. 25 shows the embodiment of FIG. 24 engaged.

FIGS. 24 and 25 show another embodiment for connecting a joint with a strut or module. As shown, a plurality of male connectors 2410 are provided on each component 115, 120. The male connectors 2410 are arranged to fit between adjacent male components 2410 on the connecting component. Pressure applied to the components 2410, as they are engaged, locks the components 2410 in place.

Each connection arrangement disclosed above may be reversed so that each component may be used again. In an embodiment, reuse occurs without having to further machine or alter the released component.

The reversible mechanical interfaces of the components described herein provides a capability to transfer electrical power in addition to mechanical and thermal loads. Structural elements 110, 115, 120, 135 may be manufactured with a hollow cross section to allow for the wiring harness 130 to be incorporated for the purpose of relaying electrical power and data. As disclosed above, the strut 120 may contain the male connectors on each end and the node 115 may contain female connectors to facilitate an arbitrary assembly of struts, nodes and modules. This arrangement ensures that the joint, or node, may interface with either struts or modules, thereby maximizing the utility of the joint. The wiring harnesses 130 may be capped or removed when not required.

In each embodiment disclosed above, the strut 120 and node 114 are axially aligned due to an arrangement, such as a groove, in the strut and a receiver specific to the arrangement such as, but not limited to, ridges, on the node that provide for only fitting together in a specific way. Once the strut 120 and joint 110 are aligned, a mechanical connection such as, but not limited to, a collar 310, is provided which engages and locks the joint mechanically to the strut. Since the joint may comprise a plurality of receiving nodes that may be provided in an arbitrary arrangement, the resulting structure may have a plurality of arrangements. By arbitrary arrangement, though the various embodiments of the joint show the joint having four nodes, more or less nodes may be provided. Thus, the joint may have an arrangement so that more than four nodes may be included on the joint.

The mechanical joints on the node 115 may contain an alignment groove or channel which only fit together one way to ensure electrical connections are made in the correct orientation. These alignment grooves also serve to handle torque loads on the strut 120. As disclosed above, the mechanical joints may contain a locking mechanism on the strut side of each joint. In another embodiment, the locking mechanism 310, 710 is on the node 115 or in yet another embodiment, the locking mechanism is a part of both components. These collars 310 may be provided so that the strut is constructed in the space or terrestrial environment as a single component through additive manufacturing.

Figure 26:
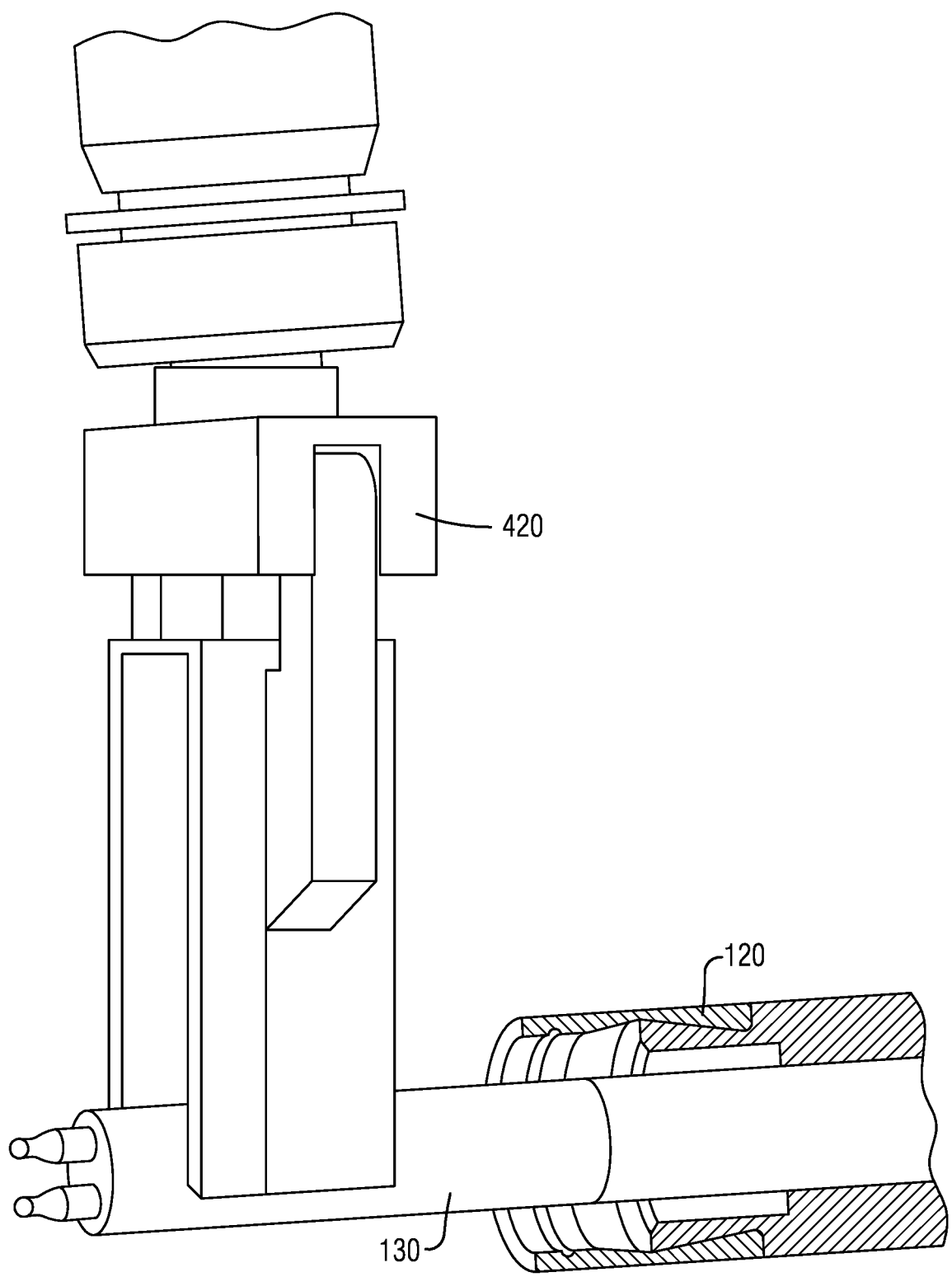
FIG. 26 shows an embodiment of a robotic manipulator in operation with an embodiment described herein.

FIG. 26 shows an embodiment of a robotic manipulator in operation with an embodiment described herein. The mechanical connection provides for a limited amount of movement for assembly such as by a robotic system 420. The mechanical connection may be a combination of locking mechanisms as disclosed above. By their nature, each locking mechanism may be reversible where the components may be immediately reusable. The joint 110 and strut 120, and internal components of either such as, but not limited to, the wiring harness 130, may be compatible with a robotic manipulator 420. Thus, the wiring harness 130 may be arranged to be handled by the robotic manipulator 420, as shown. The wiring harness 130 may be handled and exchanged by the robotic manipulator 420.

As discussed above, similar to the strut 120 and joint 110, the wiring harness 130 may be additively manufactured on-orbit using embedded wiring and metallic components. The wiring harness 130 may be additively manufactured at a same time as the strut into which it resides is manufactured. Unlike traditional wiring harnesses, the conduits are solid and become electrical structures. The wiring harnesses 130 may act as multifunctional structures, carrying both electrical and mechanical loads.

Likewise, though not shown, the strut 120, joint 110 and module 135 may be manipulated by the robotic manipulator 420 where they are engaged, disengaged and reassembled into another structure by way of the robotic manipulator 420.

Non-limiting examples of robotic manipulators include, but are not limited to, the Canadarm2, the Special Purpose Dexterous Manipulator, and the Japanese Experiment Module Remote Manipulator System, any of which may facilitate automated assembly/disassembly and reconfiguration in space. Using the robotic manipulator provides for faster, safer and cheaper in-space assembly. More specifically, the embodiments disclosed herein do not rely on human ability for assembly, which translates into a substantial reduction in risk for in-space construction of large structures.

On-orbit manufacture and robotic assembly as disclosed herein are compatible for deployable structural elements, robotic on-orbit assembly, in-space manufacture and reconfigurable infrastructure.

Figure 27A:
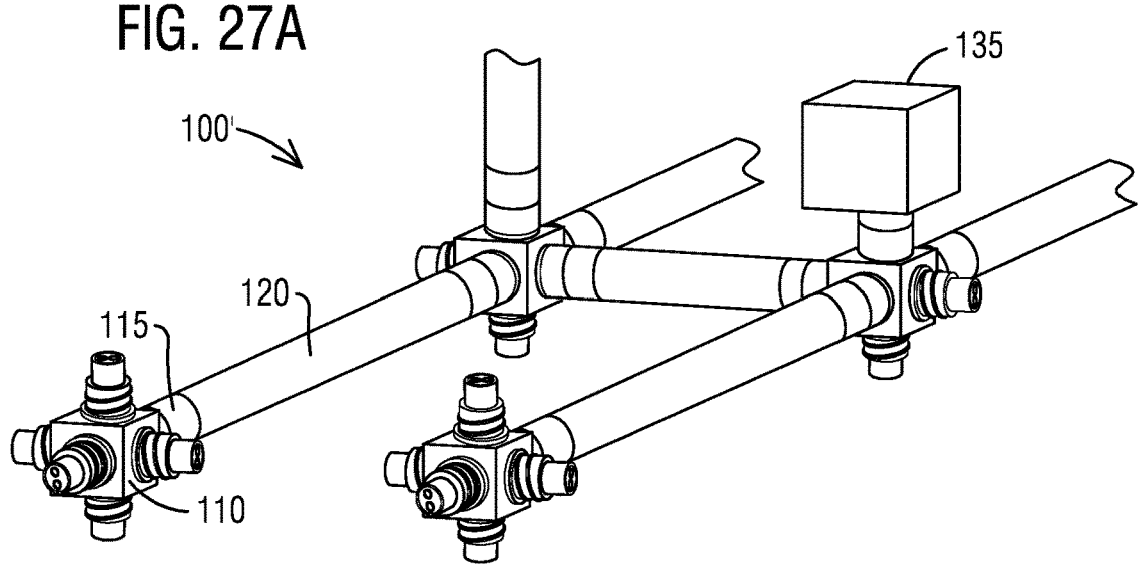
FIG. 27 shows an embodiment of a plurality of joints and struts being reconfigured.
Figure 27B:
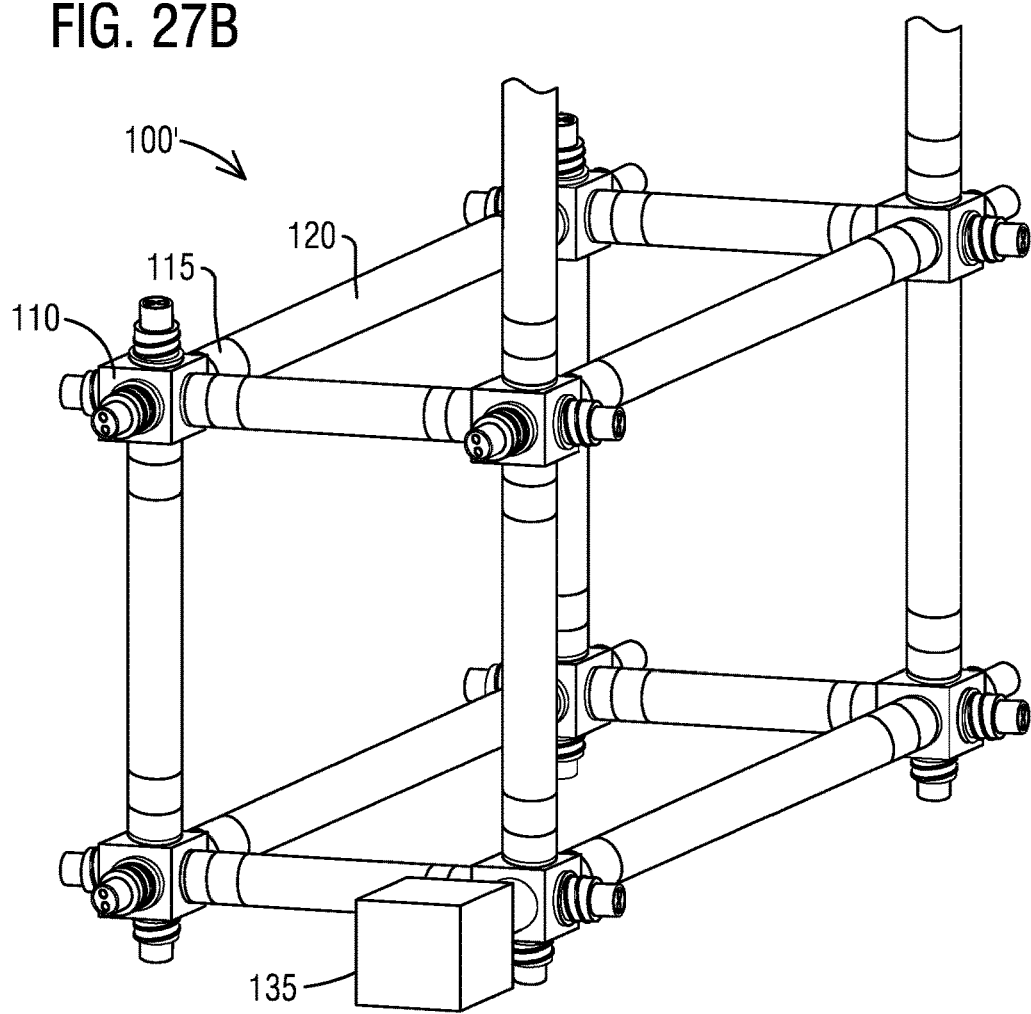

FIGS. 27A and 27B show an embodiment of a plurality of joints and struts being reconfigured. The same components 110, 115, 120, 135 may be rearranged to support dynamic requirements or evolving missions. The standardized interfaces facilitate expansion of the structure on-orbit and addition of a modular component such as, but not limited to, an ORU (depicted as a cube).

Since the mechanical and electrical interfaces between the strut 120 and joint 110 are reversible, reconfiguration of structural elements by robotic manipulators 420 on-orbit to meet dynamic mission needs is possible. Alternatively, the structural elements may be utilized to support other missions at the conclusion of a first or previous mission. Thus, as shown in FIG. 27A, a first mission structure is created. FIG. 27B shows another or second mission structure created by disassembling the first mission structure.

By reusing the components 110, 120, 135 disclosed herein among multiple missions, the total mass required to be launched from Earth is greatly reduced. Manufacturing the components disclosed herein on-orbit saves mass per component, and reusing components between missions saves mass at a system level. Additionally, the cost of the in-space infrastructure can be shared by multiple missions, leading to more cost-effective exploration architecture. The infrastructure reconfiguration also enables on-orbit repair and servicing of components. This capability allows for replacement of damaged or aging components within an infrastructure.

Figure 28:
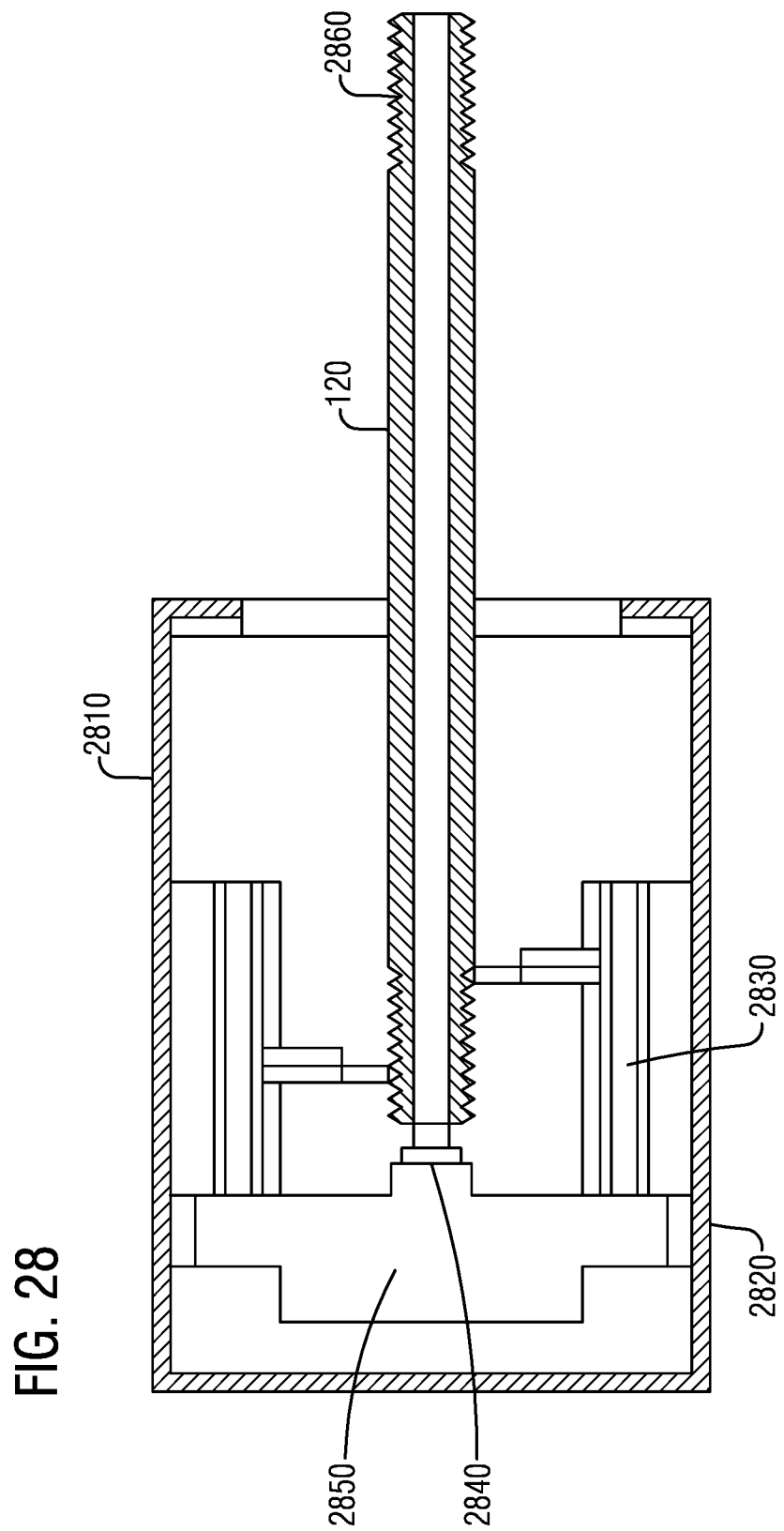
FIG. 28 shows an embodiment of a strut being manufactured.

FIG. 28 shows an embodiment of a strut being manufactured. As shown, the strut 120 is being manufactured with an additive manufacturing device 2810 that is located in space. The additive manufacturing device 2810 comprises an enclosure 2820 with a traverse build surface 2830, an extruder 2840 and feedstock 2850. As shown, a length of the strut 120 is not limited by physical characteristics of the additive manufacturing device 2810 as the strut 120 may extend beyond the structure 2820 of the additive manufacturing device 2810 such as, but not limited to, out into outer space.

The term "outer space" is not limited to any location not on earth. Therefore, this term includes low earth orbit, deep space, and other terrestrial bodies.

The strut 120 may be manufactured with a reversible joint 2860 so that the strut 120 can be engaged and disengaged from the joint 110, likely the node 115, wherein the strut and/or joint may be reused. The joint 110 may also be manufactured to allow for the strut 120 or a modular component 135 to be removed from the joint 110 for reuse. The struts 120 and nodes 115, as well as modules 135, may be additively manufactured with sensors, other functional elements to meet a diverse set of mission requirements. Each may be manufactured to provide for specific load configurations. As a non-limiting example, a cross section and a specific geometry of a strut may be tailored to support a given load.

Thus, the embodiments disclosed herein provide for lightweight structures optimized for deep space missions. The embodiments disclosed herein enable installation of orbital replacement units if components become damaged or reach their end of life. This capability significantly reduces risk during future missions and provides a flexibility to adapt in-space hardware to changing requirements or dynamic mission needs. Modular hardware architectures are possible to create a family of systems rather than single point designs for each component. A non-limiting example of this capability is a solar electric propulsion architecture for interplanetary transportation cargo missions. Using embodiments disclosed herein, replacement or expansion of solar arrays, as well as the propulsion modules, is possible. A tailored propulsion "stack" may be constructed depending on the cargo and destination.

Additionally, manufacturing the structural elements in space using feedstock launched from the ground maximizes the packing efficiency in the launch vehicle and results in structural elements far larger than those achievable with deployable technologies. Additionally, the structural members may be optimized for the space environment rather than to survive launch loads. The stiffness and strength of the components disclosed herein, especially the joints, can be tailored to meet in-space needs while minimizing mass. Unlike deployable structures which must change shape after launch, the components disclosed herein utilize a variety of reconfigurable cross sections where needed to achieve high stiffness and strength. Finally, though the discussion above is primarily specific to the joint with at least one node and a strut, the above is also specific to a module such as, but not limited to, an OMU, that may be connected to the joint. Additionally, though the discussions above are specific to embodiments being used in space, the embodiments are also applicable to Earth based uses. The uses may be located at least one of underwater, underground, above ground, or in space, where structures may be assembled either manually or with a robotic manipulator.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:

1. An outer space-based reusable manufacturing and assembly system, the system comprising:
   at least one joint, each joint comprises a plurality of nodes, each node includes a receiving element; and
   a plurality of struts that engages at least some of the nodes on a respective joint of the at least one joint, each strut includes:
   mechanical and electrical load transfer paths, and
   a wiring harness provided within the electrical load transfer path to provide electrical transfer of power to a respective joint of the at least one joint; and
   a plurality of joining elements, each joining element provides for engaging a respective strut with a respective node of the plurality of nodes to connect the respective strut for the transfer of power to the respective joint with the respective node and disengaging the respective strut from the respective node so that the plurality of struts are assembled, disassembled and reconfigured about the respective joint and usable for another mission in outer space to provide the mechanical and electrical load transfer paths.

2. The system according to claim 1, wherein each strut and each node further comprise respective mating terminating ends that mate together.

3. The system according to claim 2, wherein each strut comprises a male dovetail-based connector and each node comprises a female dovetail-based receiver.

4. The system according to claim 1, further comprising an electrical load transfer connection to transfer an electrical load between the respective strut and the respective joint when the respective strut and the respective joint are connected together.

5. The system according to claim 4, wherein the electrical load transfer connection comprises a radially arranged electrical connector extending from each strut and the at least one joint comprising an electrical receiver for engagement with the radially arranged electrical connector.

6. The system according to claim 1, wherein each joining element is a collar device.

7. The system according to claim 6, wherein the collar device is fixed to the respective strut prior to engagement of any node with the respective strut.

8. The system according to claim 7, wherein the collar device comprises a breakaway element to disengage the collar device, at a first location, from the respective strut to transition the collar device to engage with any node of the at least one joint.

9. The system according to claim 1, further comprising a modular device that engages with at least one of the at least one joint and at least one strut of the plurality of struts wherein a respective joining element of the plurality of joining elements provides for engaging and disengaging the modular device with the at least one strut so that either the at least one strut and the modular device are usable for another mission.

10. The system according to claim 1, further comprising:
a space-based robotic manipulator; and
a plurality of structural elements that are assembled, disassembled and reconfigured on-orbit by the robotic manipulator, the plurality of structural elements include the at least one joint and the plurality of struts, wherein the structural elements provide reversible mechanical and electrical interfaces for a space-based system.

11. The system according to claim 10, wherein the robotic manipulator disengages any one strut from any node.

12. The system according to claim 11, wherein the robotic manipulator causes a respective one joining element of the plurality of joining elements to be positioned in a secured arrangement when assembling the space-based system and to position the respective one joining element of the plurality of joining elements in an unsecured arrangement when disassembling the space-based system.

13. The system according to claim 10, wherein at least two of the plurality of structural elements to be engaged are arranged with a first structural element comprising at least one male dovetail-based connector and the second structural element comprises at least one female dovetail-based receiver.

14. The system according to claim 10, wherein when two structural elements are connected together the at least mechanical load transfer path and the electrical load transfer path continue between the connected structural elements.

15. The system according to claim 10, wherein:
each joining element is a collar device; and
each node comprises a locking mechanism to ensure that the collar device is fixed to both a corresponding strut and a respective node when the collar device is engaged.

16. The system according to claim 15, wherein the robotic manipulator rotates or twists the collar device.

17. The system according to claim 10, further comprising a modular device that engages with at least one of the at least one joint and at least one strut of the plurality of struts wherein a respective joining element of the plurality of joining elements provides for engaging and disengaging the modular device with the at least one strut so that either the at least one strut and the modular device are usable for another mission.

* * * * *